April 19, 1966     H. J. KAMINSKI     3,246,942

MOTION PICTURE CAMERAS

Filed March 18, 1963     3 Sheets-Sheet 1

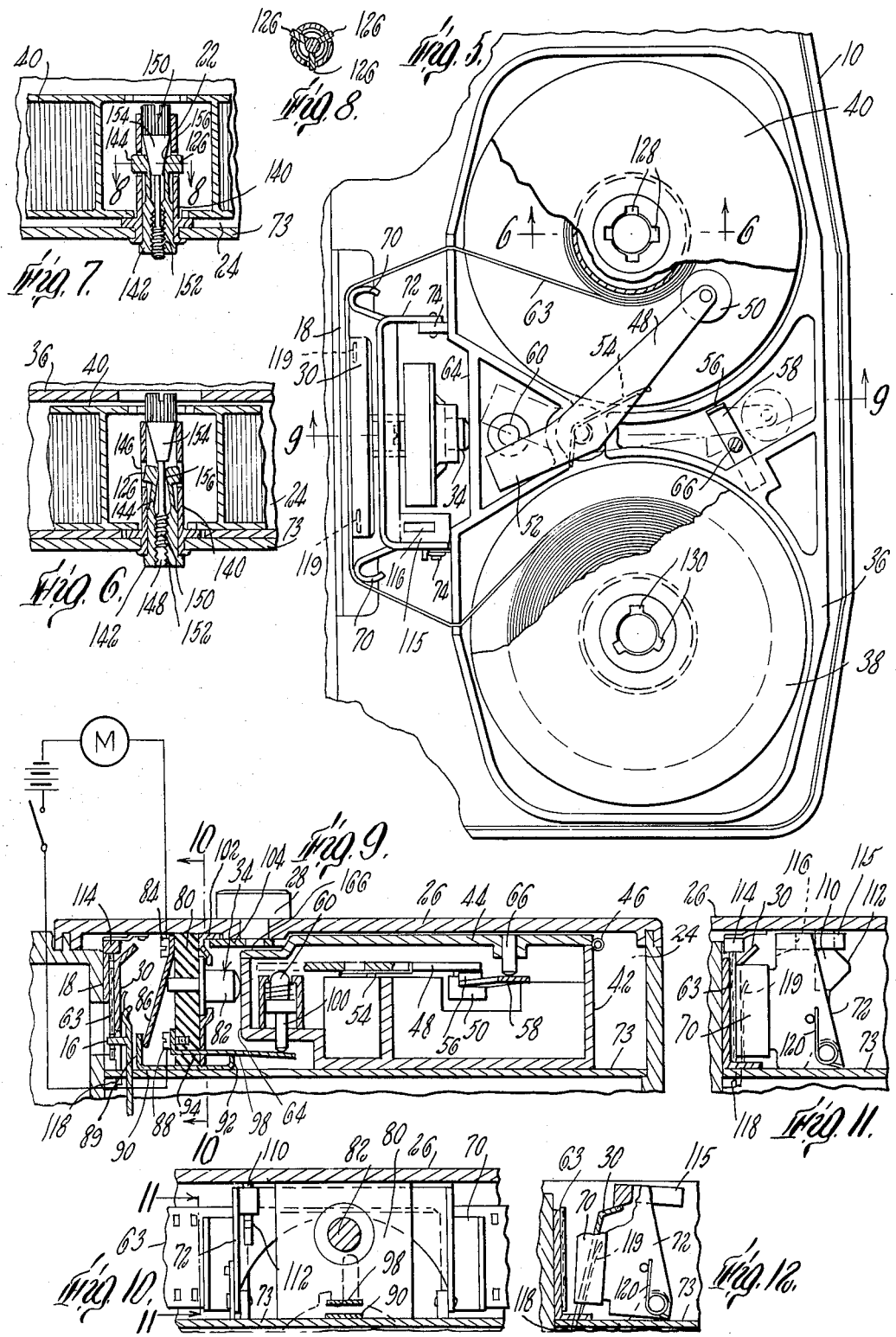

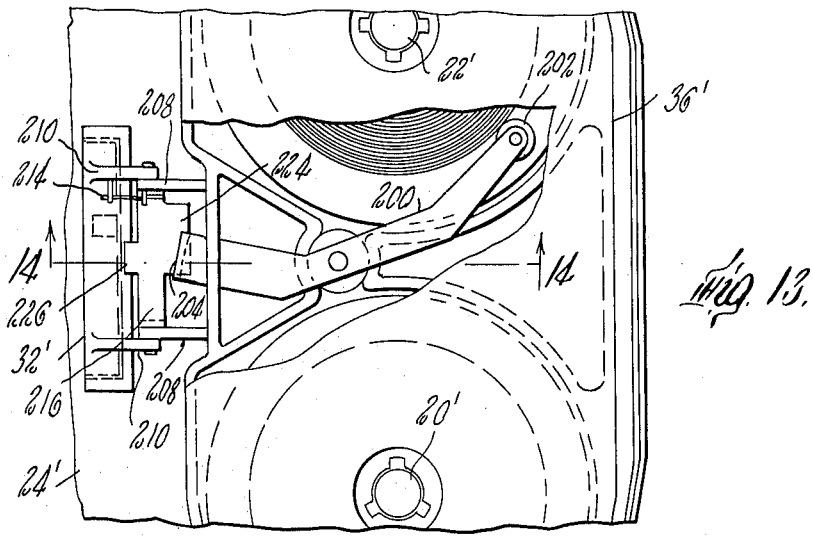
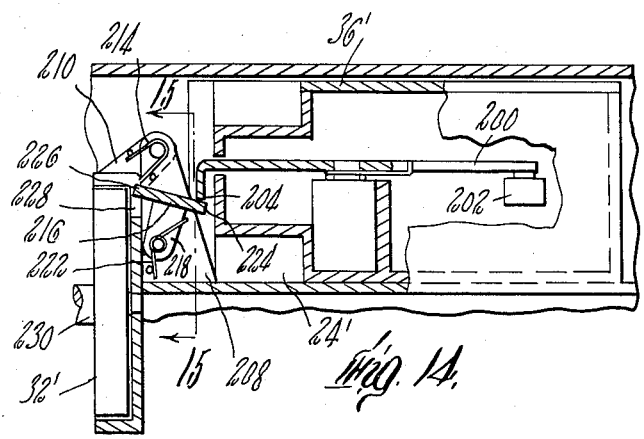
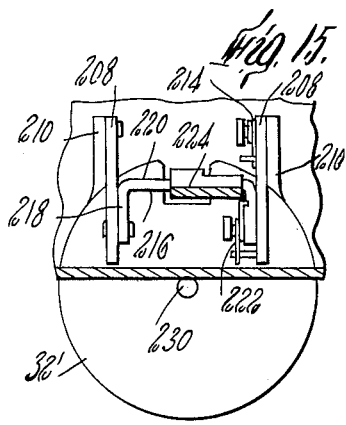
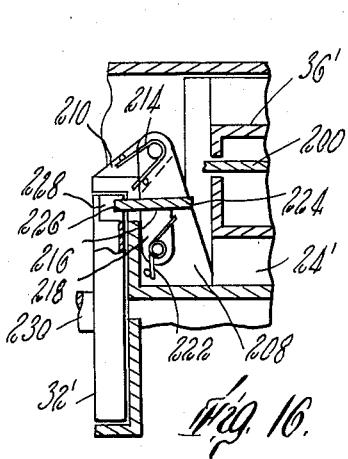
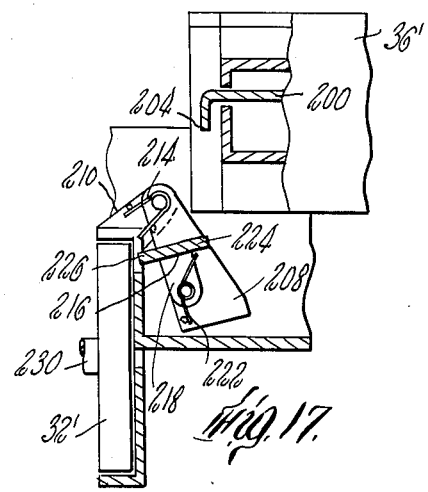

United States Patent Office

3,246,942
Patented Apr. 19, 1966

3,246,942
MOTION PICTURE CAMERAS
Henry J. Kaminski, Hingham, Mass., assignor to Keystone Camera Company, Inc., Boston, Mass., a corporation of Massachusetts
Filed Mar. 18, 1963, Ser. No. 265,766
8 Claims. (Cl. 352—73)

This invention relates to motion picture cameras and more particularly to novel and improved film handling arrangements for such cameras.

In eight millimeter cameras a film of double width is employed and the camera mechanism is arranged so that one half of the film width is exposed when the film is being driven in one direction. The film is then reversed and rewound with the other half of the film width being exposed. Conventionally, the film is supplied on a spool and it is threaded by the user of the camera from the supply spool past the aperture plate and then secured to the driven take-up spool. When the film is to be reversed for exposure of the second half, the positions of the spools are reversed and the film is rethreaded by the user past the aperture plate. Such threading operations require a degree of manual dexterity and care to insure against film damage due to over exposure to external light. In an environment of high light intensity it is often inadvisable to attempt such manipulations of spool carried film. To reduce these problems, an enclosed film magazine which includes a pressure plate has been used. In such a magazine the film leader is exposed to be positioned in driving engagement with the camera drive mechanism between the magazine's pressure plate and the fixed aperture plate in the camera case. Film reversal is accomplished by lifting the magazine out and reversing its position so that threading and film exposure problems are minimized. However, such cameras require the film magazine for proper operation and cannot handle film on the conventional spool alone as they do not have a pressure plate.

Accordingly, it is an object of this invention to provide a novel and improved camera which accommodates film on conventional spools alone and also an easily loaded casette.

Another object of this invention is to provide a novel and improved film handling apparatus for use in a motion picture camera which facilitates the reversal of film during camera operation.

Still another object of the invention is to provide a novel and improved film handling arrangement which facilitates the insertion of film into position adjacent the image aperture of a motion picture camera.

A further object of the invention is to provide novel and improved film control interlock and positioning mechanisms for use in motion picture cameras which enable film to be positioned in the camera more easily.

In accordance with the invention there is provided in the film receiving chamber of a motion picture camera an image aperture plate structure across which the film is moved in an exposure operation and a pressure plate structure which biases the film into contact with the aperture plate structure. The pressure plate structure includes guides which are latched in open position to facilitate film loading and are automatically released when the chamber is closed. The chamber also includes a driven spindle on which a film take-up spool may be mounted and a second spindle on which a supply spool may be mounted. This chamber is dimensioned to accept film mounted on conventional open spools and also to receive a casette in which two spools are secured with the film leader exposed in threading position between the spools. The casette is dimensioned to provide a wall surface behind the exposed leader which is disposed closely adjacent the pressure plate structure when the casette is placed in the film receiving chamber. The spindles in the chamber engage the spools within the casette and the film is advanced in conventional manner. The casette includes a film sensor which is interlocked with the film drive mechanism when the casette is positioned in the camera case. This sensor-drive mechanism interlock operates to disable the film drive mechanism when the film in the casette is advanced to a predetermined point so that the film loop between spools is not lost prior to reversal of the casette, while, in the absence of the casette, the camera drive mechanism operates without actuating the interlock.

In the preferred embodiments of the invention a supply spool spindle is employed which has a retractable guide tooth arrangement that facilitates the use of either a casette or the conventional spools alone. In a disclosed mechanical film sensor-drive mechanism interlock arrangement the drive shaft of the spring motor is latched while in a disclosed electrical interlock arrangement the drive motor circuit is interrupted in response the film sensor. Other objects, features and advantages of the invention will be seen as the following description of preferred embodiments thereof progresses, in conjunction with the drawings, in which:

FIG. 5 is an elevational view of a portion of the camera with the casette in position and the film positioned across the aperture plate;

FIG. 6 is a sectional view along the line 6—6 of FIG. 5 showing details of the supply spool spindle;

FIG. 7 is a sectional view of the supply spool spindle similar to FIG. 6 showing a second position of the spool engaging teeth;

FIG. 8 is a sectional view of the spindle taken along the line 8—8 of FIG. 7;

FIG. 9 is a sectional view taken along the line 9—9 of FIG. 5 showing details of the electrical film sensor interlock structure in the camera case;

FIG. 10 is a sectional view taken along the line 10—10 of FIG. 9 of the pressure plate and interlock structure;

FIG. 11 is a sectional view taken along the line 11—11 of FIG. 10 showing the pressure plate structure in a first position;

FIG. 12 is a sectional view through the pressure plate showing the pressure plate in latched position;

FIG. 13 is an elevational view of a casette incorporating a mechanical interlock structure;

FIG. 14 is a sectional view of a casette taken along the line 14—14 of FIG. 13;

FIG. 15 is a sectional view taken along the line 15—15 of FIG. 14 showing details of the mechanical interlock structure;

FIG. 16 is a sectional view similar to that of FIG. 14 showing the interlock in operative position latching the film drive mechanism; and FIG. 17 is a sectional view similar to that of FIG. 14 showing the position of the mechanical interlock mechanism with the casette removed.

Figure 1:
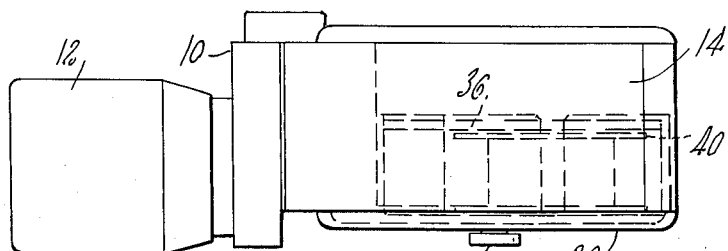
FIG. 1 is a top view of a motion picture camera constructed in accordance with the invention.

With reference to FIG. 1 the motion picture camera there shown includes a case 10 on the forward end of which is mounted a lens system 12. The camera has a drive motor indicated diagrammatically at 14 which operates a film claw mechanism 16 positioned adjacent the aperture plate structure 18 and also drives a take-up spindle 20. That spindle and a supply spool spindle are mounted within a film receiving chamber 24. The chamber has a cover 26 secured by a latch operated by knob 28 mounted on the cover.

Within this chamber, in addition to the film spool spindles 20 and 22, is a pressure plate 30 which is resiliently biased toward the aperture plate for positioning and guiding film past the aperture in an exposure operation. Mounted adjacent the pressure plate is a governor mechanism 32 and an interlock control structure 34.

Figure 2:
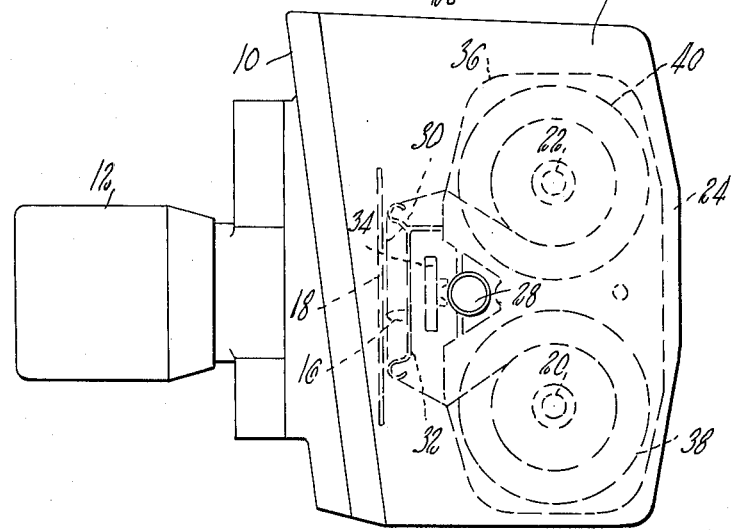
FIG. 2 is a side elevational view of the camera shown in FIG. 1.
Figure 3:
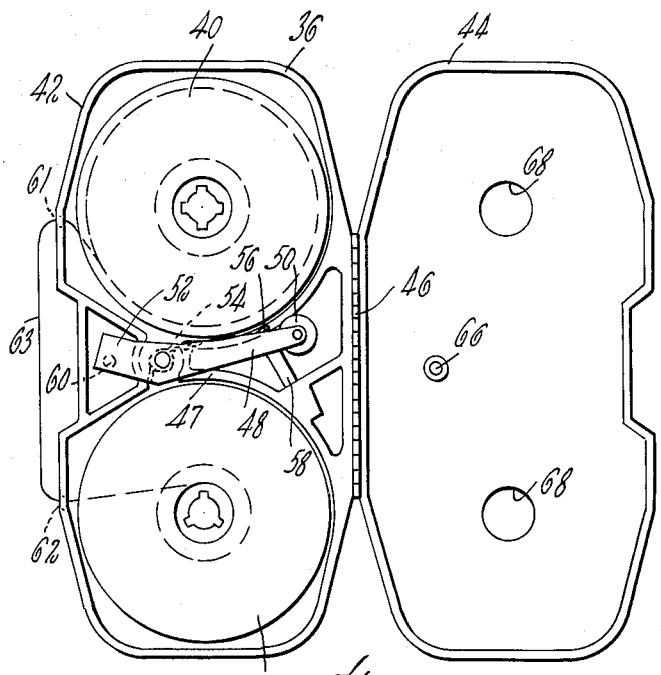
FIG. 3 is an elevational view of a casette structure employed in the camera shown in FIGS. 1 and 2, showing the casette open with two film spools therein.
Figure 4:
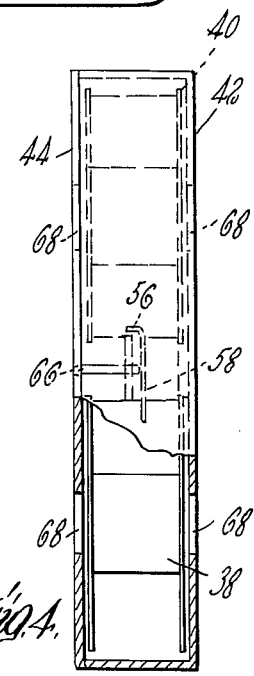
FIG. 4 is an end elevational view in partial section of the casette shown in FIG. 3 with the lid closed.

A casette 36, shown in dashed lines in FIGS. 1 and 2, encloses two film spools 38 and 40 which are positioned on the spindles 20 and 22 respectively. Additional details of this casette structure are shown in FIGS. 3 and 4. As shown in FIG. 3 the casette has a body 42 and a lid 44 which are secured together by hinge 46. Within the body there is a central dividing wall 47 which separates the casette into two recesses that receive the film spools 38 and 40. Pivotally mounted on the wall 47 is a control arm 48 which has a roller 50 on one end and a control element 52 on the other end. This arm is biased for rotation in the counterclockwise direction by spring 54. With the lid open the pivoted arm 48 may be secured in the position shown by the vertical latch portion 56 of resilient strip 58 that is secured to the partition 47. The control element 52 of the control arm 48 overlies a button 60 in this position and holds it down. The front wall of the casette 36 has two spaced elongated apertures 61, 62 through which film 63 is passed. The casette surface 64 between the apertures abuts the interlock structure 34 when the casette is in the film chamber. Carried by the lid 44 as shown in FIGS. 3 and 4 is a pin 66 which acts against the resilient strip 56 to release the biased control arm 48 when the lid is closed so that that roller 50 will engage the film surface of the film on the supply reel. The casette also includes apertures 68 to receive the positioning spindles 20 and 22.

The casette is shown positioned in the film receiving chamber in FIG. 5. As shown in that figure the film 63 is threaded between the aperture plates structure 18 and the pressure plate 30 in position for driving by the claw mechanism 16. Directly behind the pressure plate is a film guide element which has two smoothly curved ears 70 over which the film is guided. This guide element includes a bracket 72 which is pivotally secured to the base 73 of the film receiving chamber by links 74. Mounted behind this guide element is the interlock structure 34 which cooperates with the control arm 48 to control the drive mechanism.

As shown in FIG. 9, this interlock structure is fixed to the floor of the film receiving chamber and includes an electrically insulating structural member 80 on which a reciprocable button 82 is mounted. Secured to the forward surface of the insulator 80 by terminal screw 84 is a leaf contact member 86. This lower end of the leaf contact member 86 is movable by button 82 forward out of engagement with terminal screw 88, and into engagement with an upstanding contact surface 89 of a second contact member 90. Conductor 90 also has a second contact surface 92 at the rear of insulator 80. A third contact strip 94 is secured on insulator 80 by terminal screw 88 and extends rearwardly through insulator 80 so that a contact element 98 is provided which may be flexed downwardly to engage contact surface 92. The stud 100 on the base of control button 60 in the casette acts to flex strip 94 to engage contact 92 when the casette is in initial position in chamber 24.

A cover latch 102 is also secured to this fixed structure and cooperates with arm 104 carried by cover 26 that is positioned by knob 28 to secure the cover 26 in light sealing relation over the film chamber. Also carried by the cover is a pressure plate latch release 110 which has an inclined camming surface 112, and resilient film edge guides 114, shown in FIGS. 9 and 10, which bear against the edge of the film and force it downward into proper position relative to the exposure aperture.

The pivoted guide bracket structure 72 includes a lip 115 and a slot 116 through which the latch release element 110 passes when the cover 26 is placed over the chamber 24. With the cover off the pressure plate 30 can be pivoted rearwardly about the fulcrum 118 below the chamber floor and latched in a rearward position as shown in FIG. 12 to provide a generously dimensioned opening in which the film 63 may be easily positioned against the aperture plate 18. In this position the upper surface of the rearwardly extending lip portion of the pressure plate is caught under the latch surface of the film guide structure so that both the film guide surfaces 70 and the pressure plate 30 are latched in withdrawn position. When the cover 26 is positioned over the film chamber 24, the camming surface 112 enters the slot 116 and forces the guide structure rearwardly, releasing the pressure plate which is forced forward against the film 63 by biasing springs 119. When the cover 26 is seated as shown in FIG. 11, springs 120 rotate the guide structure forward to move the guide surfaces 70 into the film guiding position shown in FIG. 5.

Details of the supply reel spindle 22 are shown in FIGS. 6–8. In a conventional camera, by standardized industry practice, this spindle has three tabs or prongs 126 as shown in FIG. 8. One side of each film supply reel has four recesses 128 and the opposite side has three recesses 130, as indicated in FIGS. 3 and 5. These recesses in cooperation with tabs 126 insure the proper initial positioning of the film spools so that the emulsion side faces the exposure aperture when the film is threaded. Thus the initially full spool can be properly seated on the supply spindle 22 only where recesses 130 are down so that it will pass tabs 126. However, when the casette 36 is used the spools 38, 40 are initially placed therein in proper position so that reliance on the spindle tab configuration is unnecessary as the proper positioning of the two spools is already established. In order to facilitate positioning of the casette on the spindles, the positioning tabs are retracted when the casette is employed.

While they could be automatically retracted by the casette, in this embodiment the retracting mechanism employs a screw arrangement. The spindle 22 is in the form of a hollow cylinder 140 which is secured to the base 73 of the film receiving chamber 24. Disposed within this hollow cylinder is an insert 142 of resilient plastic which has three finger elements 144, each of which terminates in a tab 126 which is normally disposed as shown in FIG. 6 in a corresponding aperture 146 in the wall of the cylinder 140. The lower portion of this insert has a bore 148 through which a threaded actuating stud 150 extends for cooperation with the threaded hole 152. The threaded stud 150 has a tapered camming surface 154 which engages the inner surface 156 of the insert fingers so that when the stud is screwed down to the position shown in FIG. 7 the camming surface 154 acts against the finger surfaces 156 to force the tabs 126 outwardly through the apertures 146 to positions where they function in the conventional manner. When the casette is to be used, the stud 150 is merely unscrewed so that the resilient tabs are moved back into the apertures to a position that does not impede the positioning of the casette onto the spindles.

In operation, the film is initially positioned in the casette 36 as shown in FIG. 3 with the control arm 48 secured by latch 56. The film 63 is threaded so that a loop of the leader extends between the apertures 61, 62 with the leading end engaged on the take-up spool 38. The casette lid is then closed with pin 66 acting against the latch 56 to release the control arm 48 so that roller 50 is biased against the surface of the film. With the pressure plate and guide structure latched in open position, the loaded casette 36 is dropped into the film camera chamber 24 so that the leader loop is positioned between the aperture plate and the pressure plate 30. The chamber cover 26 is then positioned in light sealing relation and locked with knob 28. The positioning of the cover causes the cam 112 to free the latched pressure plate and guide structure so that they pivot forward and hold the film loop into proper position relative to the exposure aperture for engagement by the film claw 16. The edge guides 124, carried by the cover 26, act against the film edge to urge it down into proper lateral position relative to the claw mechanism 16.

In this position the forward wall surface 64 of the casette 36 engages the button 82 and forces that button forward so that contact leaf 86 is flexed forward into electrical contact with strip 90. Similarly, the restrained pin 100 in the casette forces contact strip 94 down to complete a second electrical contact with conductor strip 90. The motor control circuit which includes the motor 14, battery 162 and switch 164 thus is completed between terminals 86 and 96 through these two contacts to complete the motor energizing circuit under the control of switch 164. The motor 14 then may operate the shutter, the claw mechanism and the take-up spindle 20 to advance the film in an image recording operation.

As the film is wound off the supply reel the casette control arm 48 moves to the position shown in FIG. 5. After a few more turns of film 63 are wound off the supply spool 40, the end 52 of the control arm 48 moves out from in front of the stud 60 so that stud 100 releases the resilient spring contact element 94 and it moves upward to open the motor circuit and prevent further advance of film from the supply spool.

The camera drive is now inoperative and indicates to the user that the film must be reversed. To accomplish this all that is necessary is to open the camera cover 26, latch the pressure plate 30 back which also simultaneously withdraws and latches the film guides 70, remove and reverse the casette 36 which still has the film loop in position, and place the cover 26 back over the chamber again. The film 63 is then biased down by the edge guides 124 carried by the cover and the pressure plate 30 is unlatched so that the film is positioned for engagement with the film claw 16 and the camera is ready for operation again. This operation is accomplished quickly and easily. The inverting and reinsertion of the casette 36 restores the electrical circuit as casette surface 64 forces button 82 and leaf contact 86 forward, and surface 166 holds the contact element 94 down so that the film 63 may be wound completely off the spool then located in the supply spindle 22.

It will be noted that the film chamber which receives the casette also accepts film mounted on two conventional film spools which are positioned on the spindles. The threading, while somewhat more complicated than with the casette 36, is facilitated by the pressure plate and film guide latching arrangement, and by the fact that the edge guides 124 are carried by the cover 26. With the placing of the cover on the camera the latched pressure plate is automatically released and the camera is ready for operation. The interlock is inoperative when the casette is not in the chamber 24 as the leaf contact 84 is not urged forward, but rather remains in electrical contact with terminal 96, thus directly completing a circuit between terminals 86 and 96 making the motor circuit operative under control of switch 164 and shorting out the interlock circuitry contacts.

A second film handling arrangement which will accept either a casette or two film spools is shown in FIGS. 13–17. The same type of pressure plate latch and edge guide configuration may be employed. A similar type of film sensor is utilized in the casette 36' in the form of a pivoted control arm 200 which has a roller 202 on one end that is urged against the film surface by spring biasing means and an interlock actuator surface 204 on the opposite end of the arm. As shown in FIG. 13 this interlock actuator surface is in the form of a tab which acts against a mechanical interlock structure when the casette 36' is in the film chamber 24.

The interlock structure includes two bracket elements 208 which are pivotally mounted on ears 210 secured in the film receiving chamber 24'. The bracket elements 208 are biased by springs 214 in a counterclockwise direction as shown in FIG. 14. Supported between these two bracket elements is an interlock link 216 which has two depending arms 218, each of which is pivotally secured to a corresponding bracket element 208. Spring 222 acts to bias the link unit 216 in a counterclockwise direction as viewed in FIG. 14. The central link portion 220 carries an elongated sensor tab 224 which extends toward the casette and a latch tab 226 which extends in the opposite direction (as best shown in FIG. 13).

The interlock structure is mounted just to the rear of the governor housing 32'. The governor housing includes a slot 228 into which the latch tab 226 may be urged by spring 222. When the latch tab 226 extends through slot 228 it engages the governor structure in a latching action and prevents rotation of the drive shaft 230.

In operation, the casette is loaded in the same manner as described above and positioned in the film chamber 24'. In this position the control arm 200 as shown in FIG. 13 bears against the sensor tab 224 to rotate the interlock link 216 in a clockwise direction. The casette also rotates the bracket elements 208 in the clockwise direction so that the interlock structure assumes the position shown in FIG. 14. As the film is drawn off the supply reel the control arm surface 204 moves across the interlock sensor tab 224 and finally frees it so that the spring 222 rotates the interlock link in the counterclockwise direction to the position shown in FIG. 16. In that position the latch tab 226 protrudes through the slot 228 in the governor housing 32' to latch the governor mechanism and the drive shaft 230, preventing operation of the film drive mechanism. This embodiment is particularly useful with the spring type of film drive motors.

When the drive becomes latched in this manner, the camera opeartor opens the camera case to remove and reverse the casette 36'. The reversing operation is easily accomplished with the pressure plate and film guides being latched back and after the film loop has freed when the cover is repositioned. When the casette 36' is in the reversed position, the interlock mechanism is secured in unlatched position as the control arm surface 204 overlies sensor tab 224 and never becomes disengaged.

When the casette structure is not employed, the bracket elements 208 are biased to the position shown in FIG. 17 by the springs 214, in which position the drive interlock is inoperative and the camera may be operated in the conventional manner.

Thus it will be seen that the invention provides a novel film handling mechanism arrangement which accommodates film in a casette structure and in conventional spools alone. Threading of the film is facilitated by the latching mechanism of the film aligning elements. It is apparent that modifications of the disclosed embodiments of the invention will be obvious to those skilled in the art. Therefore, it is not intended that the invention be limited to the disclosed embodiments or to details thereof, and departures may be made therefrom within the spirit and scope of the invention as defined in the claims.

I claim:

1. A motion picture camera comprising a film receiving chamber,
    an exposure aperture in said chamber,
    two spaced guide elements mounted in said chamber,
    a pressure plate mounted in said chamber between said guide elements adjacent said exposure aperture,
    means for mounting said guide elements and said pressure plate for simultaneous pivotal movement away from said exposure aperture to provide a film threading channel of substantial width,
    means for advancing film between said exposure aperture and said pressure plate, a pair of spool receiving spindles in said chamber for positioning film spools therein, a casette adapted to receive two film spools with a loop portion of the film extending between said spools being exposed externally of said casette, said spools being adapted to be positioned on said spindles in said chamber so that the spools in said casette are in driven engagement with said spindles and said loop of film extends over said guide elements and between said exposure aperture and said pressure plate, a film position sensor in said casette, and an interlock mechanism coupled to said film advancing means and responsive to the positioning of a casette in said chamber for rendering said film advancing means inoperative in response to a predetermined position of film in the casette.

2. The camera as claimed in claim 1 wherein said film position sensor and said interlock mechanism are operative to render said film advancing means inoperative only when said casette is in one of two operative positions in said chamber.

3. The camera as claimed in claim 1 and further including latch means for holding said pressure plate spaced from said exposure aperture, and means responsive to the closing of said film receiving chamber to release said latch means.

4. The camera as claimed in claim 3 wherein said film guide elements are coupled to said latch means so that said latch means holds both said pressure plate and said film guide elements in latched position spaced from said exposure aperture.

5. The camera as claimed in claim 4 and further including a cover for said chamber and film edge guide means carried by said chamber cover.

6. The camera as claimed in claim 1 wherein said film advancing means is controlled by an electrical circuit, said interlock mechanism includes first and second electrical control elements, said first control element being responsive to said film sensor and having a normally open contact, and said second element being responsive to the position of said casette in said chamber and having two circuit completing positions, a first position bypassing said first element when said casette is not in said chamber and a second position completing a circuit in series with said normally open contact of said first element when said casette is in said chamber.

7. Motion picture apparatus comprising a film receiving chamber, an image aperture disposed in one wall of said chamber, spool drive means having a coupling member in said chamber, a casette adapted to receive two film spools in enclosing relation and to be positioned in said chamber so that one of said film spools is in driven engagement with said spool drive means, means in said chamber including pair of spaced guide elements for guiding film along a straight path parallel to said one wall, means disposed in said chamber between said guide elements for biasing film held in said casette against said image aperture, means for mounting said guide elements and said biasing means for simultaneous pivotal movement from a position closely adjacent to said one wall to a position spaced from said one wall to define a channel of substantial width for receiving film in a threading operation, means adjacent said image aperture for advancing film past said image aperture, a film position sensor adapted to be biased against film in said casette, and an interlock mechanism coupled to said film advancing means for rendering said film advancing means inoperative in response to a predetermined position of film in said casette, said interlock mechanism including a first element mounted for movement into an operative position in response to the positioning of said casette in said chamber in a first position, and a second element for rendering said film advancing means inoperative in response to a predetermined position of said film position sensor when said first element is in said operative position.

8. The motion picture apparatus as claimed in claim 7 and further including an electric drive motor for driving said film advancing means, an electric switch controlling the circuit of said drive motor, and wherein said second element of said interlock mechanism operates to open said drive motor circuit to deenergize said drive motor when the film in said casette reaches said predetermined position.

References Cited by the Examiner

UNITED STATES PATENTS

| | | | |
|---|---|---|---|
| 2,029,736 | 2/1936 | Morsbach | 352—176 |
| 2,080,086 | 5/1937 | Mihalyi | 352—73 |
| 2,351,088 | 6/1944 | Wilson et al. | 352—73 |
| 2,505,329 | 4/1950 | Jacobson | 242—46.2 |
| 2,581,691 | 1/1952 | Moomaw et al. | 242—71 |
| 2,959,091 | 11/1960 | Richartz | 88—18 |
| 3,001,440 | 9/1961 | Foster | 88—17 |
| 3,085,467 | 4/1963 | Mayer | 352—72 |
| 3,106,126 | 10/1963 | Kirk | 88—16 |
| 3,120,781 | 2/1964 | Babcock et al. | 352—72 |

JULIA E. COINER, *Primary Examiner.*